(12) United States Patent
Sasakura et al.

(10) Patent No.: US 6,633,350 B2
(45) Date of Patent: *Oct. 14, 2003

(54) ILLUMINATION DEVICE AND DISPLAY APPARATUS INCLUDING SAME

(75) Inventors: Takao Sasakura, Yokohama (JP); Noritaka Mochizuki, Yokohama (JP); Hiroaki Hoshi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,476

(22) Filed: Jun. 9, 1999

(65) Prior Publication Data

US 2002/0005921 A1 Jan. 17, 2002

Related U.S. Application Data

(62) Division of application No. 08/546,085, filed on Oct. 20, 1995, now Pat. No. 5,929,951.

(30) Foreign Application Priority Data

Oct. 21, 1994 (JP) .............................. 6-256570
Jan. 9, 1995 (JP) .............................. 7-001527
Aug. 29, 1995 (JP) .............................. 7-220870

(51) Int. Cl.⁷ .......................... G02F 1/1335; F21V 7/04
(52) U.S. Cl. ............................... 349/62; 362/31
(58) Field of Search .................... 349/61, 62, 64, 349/65, 67; 362/29, 31, 30; 359/559

(56) References Cited

U.S. PATENT DOCUMENTS

| | | | |
|---|---|---|---|
| 4,664,481 A | * 5/1987 | Ito et al. ........................ 349/62 |
| 4,765,718 A | 8/1988 | Henkes ........................ 350/345 |
| 4,798,448 A | 1/1989 | Van Raalte ................... 350/345 |
| 5,046,826 A | * 9/1991 | Iwamoto et al. ............... 359/49 |
| RE33,987 E | 7/1992 | Suzawa ......................... 359/49 |
| 5,414,599 A | * 5/1995 | Kaneko et al. ................. 362/31 |
| 5,442,523 A | * 8/1995 | Kashima et al. ............... 362/31 |
| 5,567,042 A | 10/1996 | Farchmin et al. .............. 362/29 |
| 5,587,816 A | * 12/1996 | Gunjima et al. ............... 349/62 |
| 5,631,065 A | * 5/1997 | Gordon ......................... 349/62 |
| 5,648,827 A | 7/1997 | Shaw ............................ 349/61 |
| 5,801,885 A | * 9/1998 | Togino ........................ 359/630 |
| 5,833,344 A | * 11/1998 | Arai et al. ..................... 362/31 |
| 5,929,951 A | * 7/1999 | Sasakura et al. ............... 349/62 |
| 6,023,316 A | * 2/2000 | Yano ............................. 349/62 |

FOREIGN PATENT DOCUMENTS

| | | |
|---|---|---|
| JP | 4-67016 | 3/1992 |
| JP | 4-86620 | 3/1992 |
| JP | 5-477 | 1/1993 |
| JP | 6-88961 | 3/1994 |
| JP | 6-331831 | 12/1994 |

* cited by examiner

Primary Examiner—Tarifur Chowdhury
Assistant Examiner—Dung Nguyen
(74) Attorney, Agent, or Firm—Fitzpatrick, Cella, Harper & Scinto

(57) ABSTRACT

A display apparatus is constituted by a planar display device and a planar illumination device therefor. A lowering in light quantity at a periphery of the planar illumination device is prevented by inserting a reflection member, such as a reflection frame, having an inside reflection surface along the periphery of the illumination device, or a combination of a scattering means and a transparent sheet member between the display device and the illumination device. A plurality of the display apparatus may be combined to allow an associate movement thereof so as to constitute a composite display apparatus, such as a head-mount display.

4 Claims, 14 Drawing Sheets

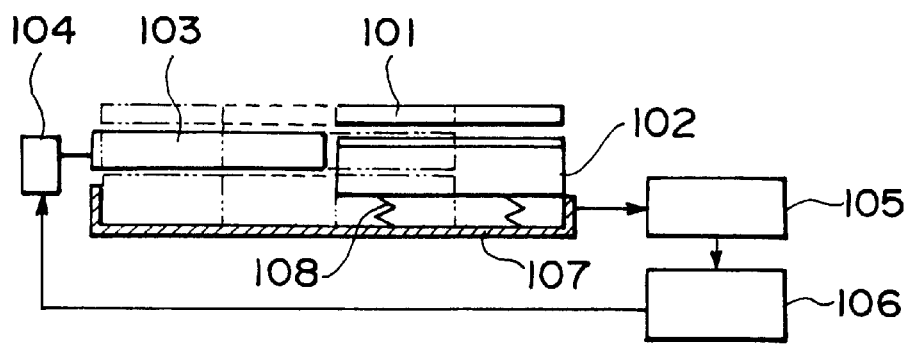
F I G. 5A
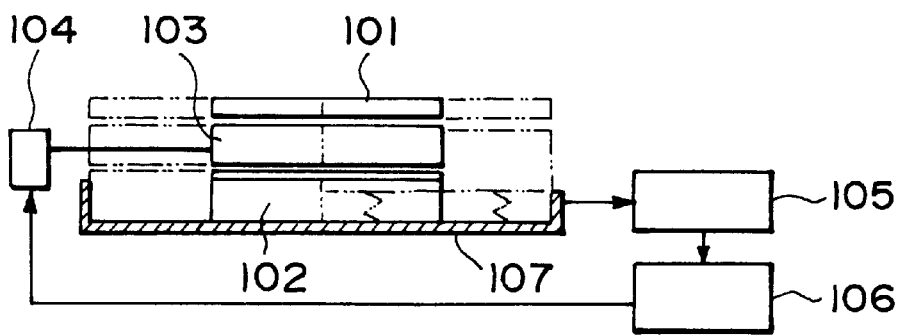
F I G. 5B
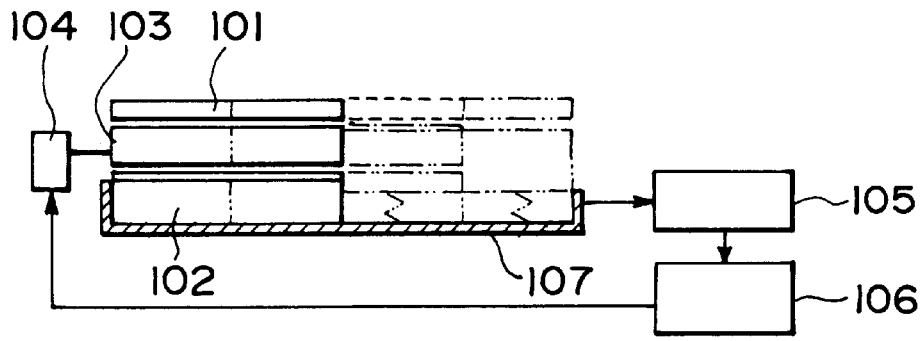
F I G. 5C

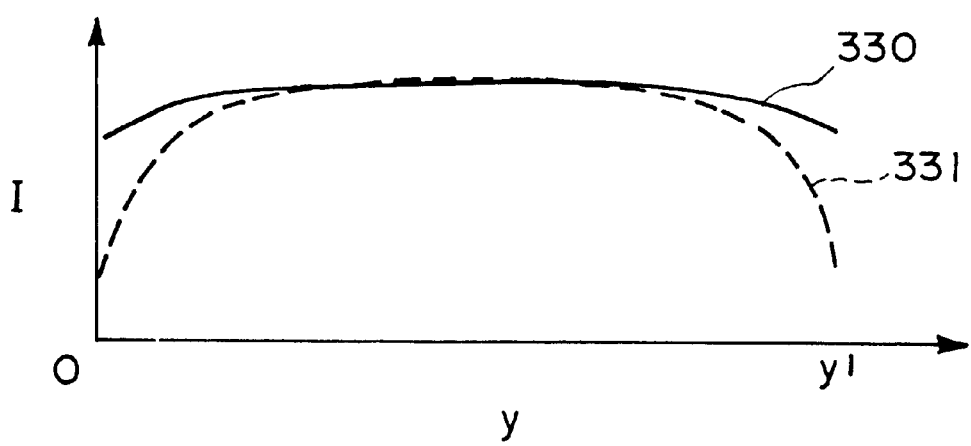
F I G. 18
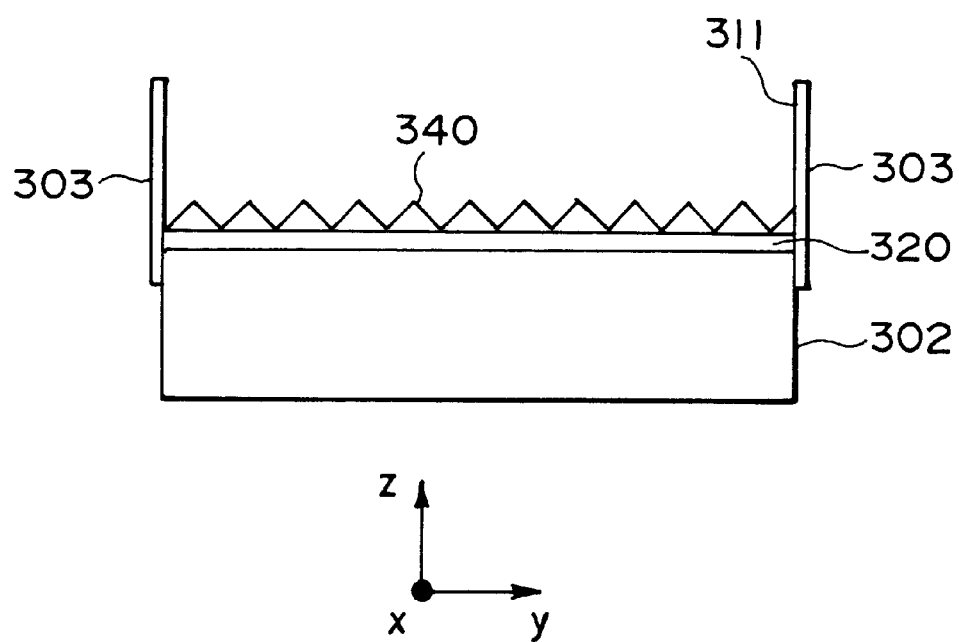
F I G. 19

ILLUMINATION DEVICE AND DISPLAY APPARATUS INCLUDING SAME

This application is a division of application Ser. No. 08/546,085, filed Oct. 20, 1995, now U.S. Pat. No. 5,929,951.

FIELD OF THE INVENTION AND RELATED ART

The present invention relates to a display apparatus suitable for use in a computer display, a view finder for a video camera, a light valve for a video projector, a head-mount display, etc., and particularly an illumination device for such a display apparatus.

An illumination device can be required to have a specific luminance distribution depending on its use and is typically required to show a uniform luminance distribution, e.g., a two-dimensionally uniform distribution as desired in a display apparatus. Particularly, display apparatus including an optical modulation device such as a liquid crystal device frequently use surface illuminant devices, a representative example of which may be one disclosed in Japanese Laid-Open Patent Application (JP-A) 4-86620.

An image display apparatus, such as a head-mount display (HMD) may include a small-sized liquid crystal display device (LCD) of, e.g., ca. 0.7 inch, for which a planar fluorescent lamp has been principally used as a backlight (i.e., illumination device). The backlight may typically show a luminance distribution having a maximum at its center and falling toward the peripheries as represented by a dot and dash line shown in FIG. 1.

As another conventional example of display apparatus requiring an illumination device, a liquid crystal view finder for use in video camera recorders, etc., will now be described.

FIG. 2 illustrates a manner of illuminating such a liquid crystal view finder.

The liquid crystal view finder 101 includes a liquid crystal panel (liquid crystal display device) P of the transmission type for displaying various data by utilizing the liquid crystal. The panel is provided with polarizers 102 and 103 applied to both surfaces thereof. On the backside (illustrated as the lower side) of the liquid crystal panel P, a cold cathode lamp (illumination device) 105 having an areal size almost equal to that of the panel P so as to illuminate the panel P. On the front side (illustrated as the upper side) of the panel, a virtual image-focusing optical system 106 is disposed, so that light L1 having passed through the liquid crystal panel P reaches human eyes E via the virtual image-focusing system 106 to recognize the data displayed on the liquid crystal panel P.

The light issued from the above-mentioned cold cathode lamp 105 should desirably have a uniform light quantity distribution. For this reason, the cold cathode lamp 105 is provided with surface unevennesses to form a scattering surface 107 whereby the light from the cold cathode lamp 105 is scattered.

However, such a cold cathode lamp 105 has not been able to provide a uniform light quantity or luminance distribution by the scattering surface 107 alone. According to our observation, the luminance distribution has been found considerably ununiform as represented by a dashed line A in FIG. 3 such that a quantity $I_1$ reaching at edges of the liquid crystal panel is only about 30% of a light quantity $I_2$ reaching the center. Herein, $Y_1$ on the abscissa represents the size (width) of the image display area of the liquid crystal panel P, and the ordinate I represents a light quantity introduced into the NA (numerical aperture determined by the entrance pupil and focal length of the optical system), which light quantity is actually in the form of a three-dimensional cone.

Incidentally, the reason why the light quantity $I_1$ reaching edges of the liquid crystal panel P is low, may be attributable to a factor that a liquid crystal panel P has an areal size almost equal to that of the cold cathode ray tube and the edges of the liquid crystal panel P coincide with those of the cold cathode lamp 105 so that light supply to the panel edges becomes insufficient. On the other hand, the center is supplied with a sufficient quantity of light from the cold cathode lamp 105 compared with the edges.

Then, in a case where such a cold cathode lamp 105 is used for illuminating a liquid crystal panel P as mentioned above, there occurs an image quality degradation due to a luminance irregularity. This difficulty becomes pronounced for displaying, e.g., an image of a wide angle object taken at a panoramic wide angle.

As a solution to the above-mentioned problem, it has been proposed to use a filter having a non-uniform transmittance distribution by the above-mentioned JP-A 4-86620. The filter is designed to have a transmittance at the center which is lower than those at edges so as to provide a transmitted light quantity (corr. to $I_2$) lower than a transmitted light quantity (corr. to $I_1$) at edges, thus providing a uniform light quantity distribution. According to this method, however, the emitted light quantity per se from the illumination device is lowered, thus resulting in a new problem of image quality degradation due to dark illumination. The method further involves a lowering in electric power efficiency causing an increased drive cost and difficult and expensive production of the filter, thus being liable to provide an obstacle to practical application.

SUMMARY OF THE INVENTION

An object of the present invention is to provide an illumination device capable of moderating a remarkable lowering in luminance that occurs at the edges or sides thereof to provide illumination light having a uniform luminance distribution and also a display apparatus including such an illumination device.

Another object of the present invention is to provide an illumination device capable of providing illumination light having a uniform luminance distribution without remarkably lowering the luminance at the center thereof and a display apparatus including such an illumination device.

Another object of the present invention is to provide a display apparatus capable of preventing a lowering in display image quality due to ununiform light quantity distribution.

According to an aspect of the present invention, there is provided a display apparatus, comprising at least: a liquid crystal display device for image display, a backlight for illuminating the liquid crystal display device, and a reflection member having a size almost equal to an outer frame of the liquid crystal display device and disposed insertable between the liquid crystal display device and the backlight.

According to the present invention, it is possible to reduce the difference between the light quantities at the peripheries and the center of the backlight by inserting a reflection frame having a reflection surface between a liquid crystal display device and a backlight.

Further, according to the present invention, two types of light quantity (luminance) distributions from the backlight by providing two states wherein the reflection frame is inserted between and retreated from between the liquid crystal display device and the backlight.

Further, by providing a position sensor for detecting the position of the liquid crystal display device and the backlight and controlling a reflection frame support and control mechanism based on the detection result, it becomes easy to control the insertion and retreat of the reflection frame.

In a first state in the above instance, the reflection frame may be inserted to provide an increased peripheral quantity. In a second state, the reflection frame may retreat and the backlight may be disclosed close to the liquid crystal display device so as to prevent the lowering in light quantity at the center. These two states may be appropriately realized.

By using at least two display apparatus, it becomes possible to realize an image display apparatus, such as HMD.

By moving the liquid crystal display devices and the backlights in the at least two display apparatus in association with each other or in an interlocked manner so that all the display apparatus are in the first state when the display devices and the backlights are in the first position and in the second state when the display device and the backlights are in the second position, it is possible to provide an optimum light quantity (luminance) distribution for plural display apparatus, such as HMD.

According to a second aspect of the present invention, there is provided an illumination device, comprising: a light source, a scattering means disposed contiguous to the light source for scattering emitted light from the light source when the emitted light passes the scattering means, and a transparent sheet member disposed contiguous to the scattering means.

As a result, emitted light from the light source is transmitted through the diffusion means and the transparent sheet member, and at least a portion of the transmitted light through the sheet member is reflected by the light emission-side boundary of the sheet member toward the scattering means to be scattered thereat, whereby the directionality and utilization of the emitted light from the light source is improved to provide a better uniformity of light quantity distribution. The scattering means may be composed as a member having a surface unevenness or a layer having such a surface unevenness or showing a similar light scattering function.

According to another aspect of the present invention, there is provided an illumination device, comprising: a light source having a diffusion surface, and a reflection member disposed vertical to the diffusion surface along an edge of the diffusion surface and having at least one inside surface forming a reflecting surface.

According to still another aspect of the present invention, there is provided an illumination device, comprising: a light source having a diffusion surface, a triangular prism array disposed contiguous to the diffusion surface, and a reflection member disposed vertical to the diffusion surface along an edge of the diffusion surface and having at least one inside surface forming a reflecting surface.

According to a further aspect of the present invention, there is provided a display apparatus comprising an illumination device as described above, and a display device illuminated by the illumination device to display various data. In this instance, the illumination device can be designed to have a larger area than the display device including a marginal surface area outside the display device, said marginal surface area is covered with a light-shielding means so as to avoid unnecessary illumination light.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5A–5C are schematic views for illustrating an operation of a display apparatus according to a second embodiment of the invention.

FIG. 18 is a graph illustrating light quantity distributions from planar illuminant devices.

FIG. 19 is a schematic sectional view of a planar illuminant device according to a seventh embodiment of the invention.

DESCRIPTION OF THE PREFERRED EMBODIMENTS

The present invention provides an illumination device including a light source and an improved optical system by which a non-desirable light quantity decrease (luminance lowering) at light source edges (sides) is prevented.

An example of the improved optical system is given by a reflection member for increasing the luminance at the light source edges.

In a case where the light source is in the form of a quadrangle inclusive of a square and a rectangle and is desired to issue a uniform planar illumination light, the reflection member may preferably be in the form of a frame encircling four sides, of which all the inner surfaces may desirably constitute reflecting surfaces. However, in a case where a luminance lowering for only one side is desired to be prevented, the reflection member may assume a wall-like member disposed along one side.

The reflection members may be formed by a frame-shaped or a wall-shaped substrate coated with a metal or dielectric laminate film so as to provide a reflecting surface. The substrate may comprise a transparent or opaque material, such as glass or plastic, and may preferably comprise a molded plastic of, e.g., acrylic resin or polycarbonate from the viewpoint of easiness of shaping.

Another example of the improved optical system used in the present invention may be constituted by a combination of a scattering section and a transparent sheet member.

Some specific embodiments of the present invention will now be described.

(First Embodiment)

Figure 4:
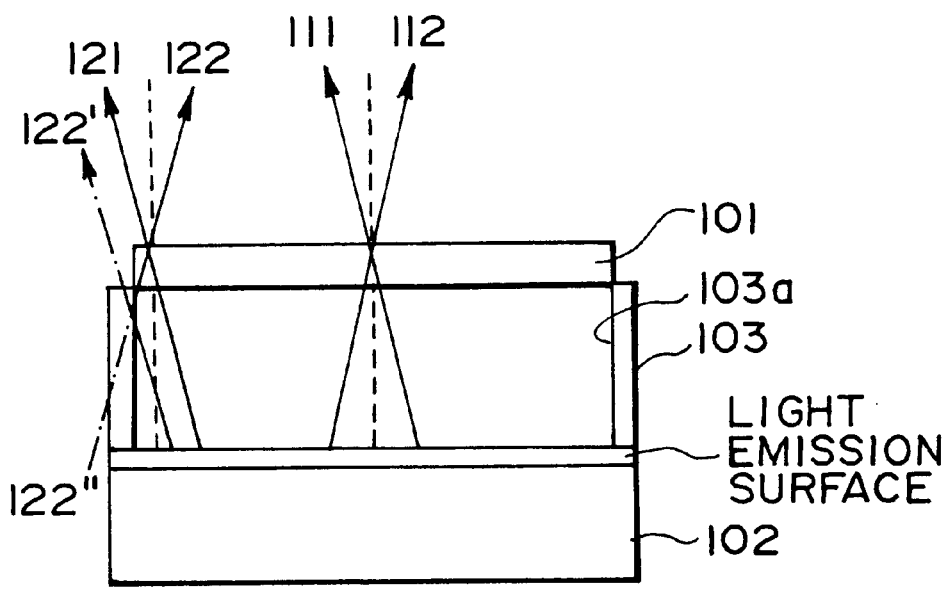
FIG. 4 is a schematic illustration of a display apparatus according to a first embodiment of the invention.
Figure 6:
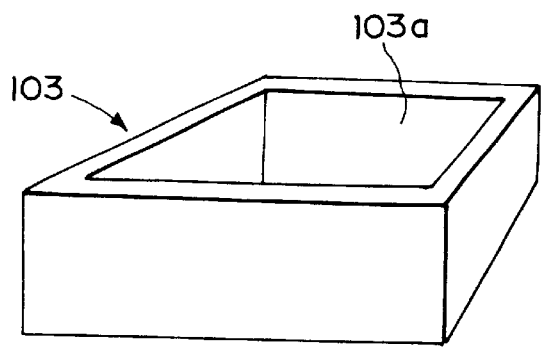
FIG. 6 is a schematic perspective view of a reflection frame used in the invention.

FIG. 4 is a schematic sectional illustration of a display apparatus including an illumination device according to a first embodiment of the present invention.

The display apparatus includes a LCD panel (display device) 101, and a backlight 102 comprising a planar fluorescent lamp. In this embodiment, the illumination device also includes a reflection frame (reflection member) having inner surfaces 103a constituting a totally reflecting surface.

The effect of the reflection frame 103 is as follows. As shown in FIG. 4, e.g., light fluxes 111 and 112 from the center of the backlight 102 intersect each other on the LCD 101. In order to obtain an identical light quantity at a periphery, it may be necessary to provide, in addition to a light flux 121, a hypothetical light flux 122", which however is actually not present. On the other hand, if the reflection frame 103 is inserted as shown in FIG. 4, a light flux, which goes outwards in the absence of such a reflection frame 103, is reflected as a light flux 122 as shown. As a result, the light flux 121 and the light flux 122 intersect each other on the LCD 101, thereby providing a light quantity similar to that at the center.

Figure 1:
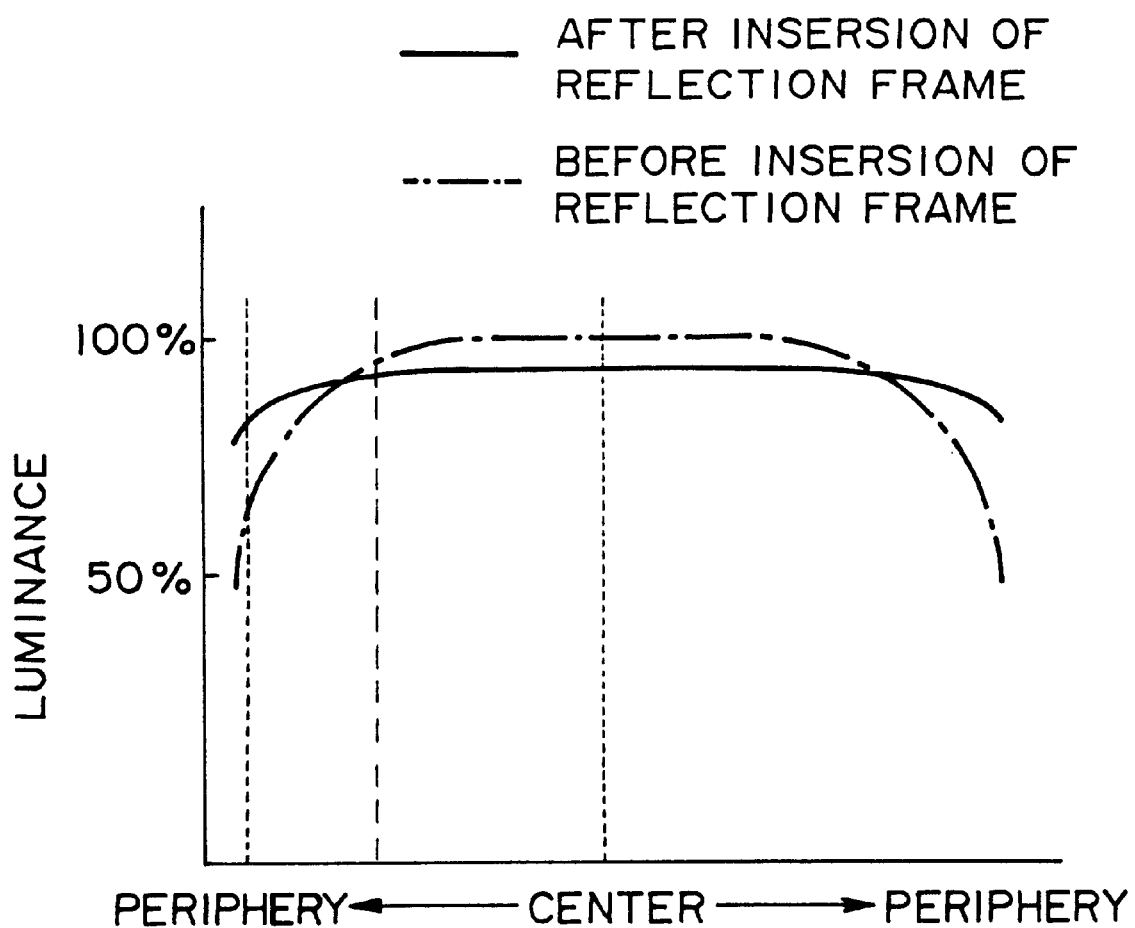
FIG. 1 is a graph showing light quantity distributions of a backlight comprising a planar fluorescent lamp.
Figure 2:
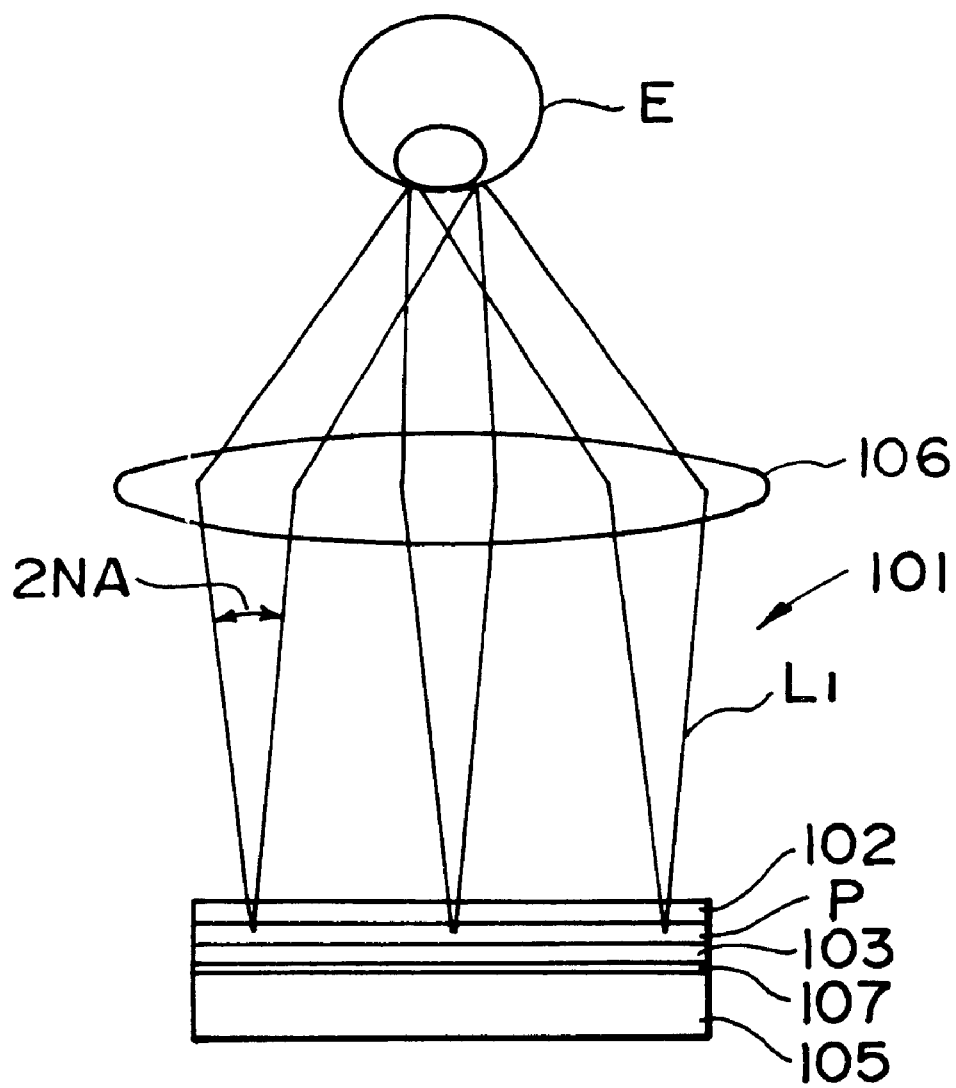
FIG. 2 is an illustration of an optical system including a known display apparatus.
Figure 2:
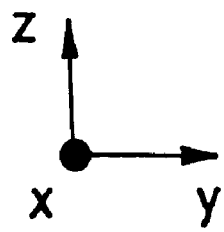

An improved luminance distribution obtained in the above-described manner may be represented by a solid line in FIG. 1.

(Second Embodiment)

A display apparatus according to a second embodiment of the present invention will be described with reference to FIGS. 5A–5C, 6 and 7.

Figure 9A:
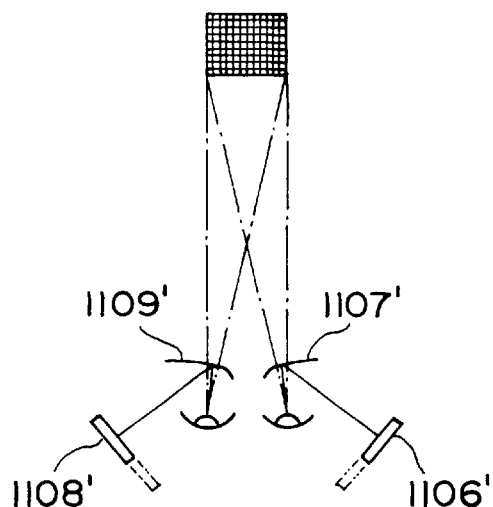
FIGS. 9A–9C are schematic views for illustrating an operation of a display apparatus according to a second embodiment of the invention.
Figure 9B:
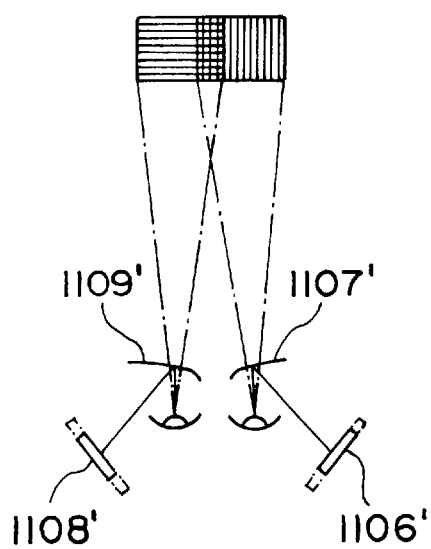
Figure 9C:
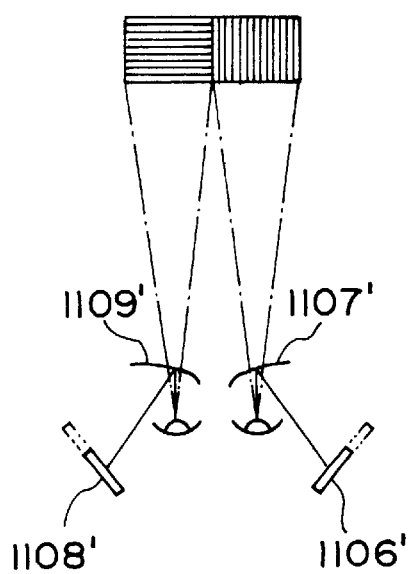

FIGS. 5A–5C are schematic sectional views of a part of a display apparatus according to this embodiment in three states in operation. More specifically, the display apparatus shown in FIG. 1 is a binary image display apparatus including two identical display apparatus disposed laterally in combination for use in a HMD. FIGS. 5A–5C shown only one of the laterally disposed two display apparatus, and the other one (not shown) is disposed laterally symmetrically with the shown one. More specifically, such a symmetrical mating apparatus (not shown) may be disposed on a left side of the apparatus shown in FIGS. 5A–5C in case where image light from the display apparatus reaches a human eye after an odd-numbered times of reflection (as shown in FIGS. 9A–9C described hereinafter) and on a right side of the apparatus shown in FIGS. 5A–5C in case where image light from the display apparatus reaches a human dye after an even-numbered times of reflection.

Referring to FIGS. 5A–5C, a shown half of the binary display apparatus includes a LCD panel (liquid crystal display device) 101 of the transmission-type, a backlight 102 comprising a planar fluorescent lamp, a reflection frame 103 disposed insertable between the LCD 101 and the backlight 102, a reflection frame support and control mechanism 104 including a supporting member for horizontally supporting the reflection frame 103 and a position control system therefor, a position sensor 105 for detecting the horizontal positions of the LCD 101 and the backlight 102, a control circuit 106 for receiving data from the position sensor 105 and supplying a control signal to the reflection frame support and control mechanism 104, a LCD unit-moving frame 107 in which the LCD 101 and the backlight 102 are moved horizontally thereon, and a backlight-supporting member 108 for supporting the backlight 102 in a direction toward and away from a viewer, i.e., a vertical direction in the figure.

The LCD 101 is of the transmission type and is designed to be observed from an upper point (in the figure) with a transmitted portion of light issued from the upper emission surface of the backlight 102. The LCD 101 and the backlight 102 are horizontally moved in an interlocked relationship, i.e., integrally while retaining a relative position with each other, though it is not illustrated specifically. In other words, the LCD 101 and the backlight 102 constitutes a unit which moves in a horizontal direction, i.e., in a transverse direction in the figure, within the LCD unit-moving frame 107.

The reflection frame 103 is desired to have an inner side forming an almost totally reflecting surface 103a, e.g., covered with a silver plating layer. The reflection frame 103 has a size conforming to the outer frame of the LCD 101. The reflection frame 103 is held to have a fixed position in a direction toward the viewer (i.e., in a vertical direction in FIGS. 5A–5C) and controlled to move horizontally in FIGS. 5A–5C by the reflection frame support and control mechanism 104.

Now, some description will be made regarding a HMD constituted by a display apparatus according to the invention.

It has been practiced to use a binary image display apparatus including two (systems of) display apparatus, such as a so-called HMD (head-mount display) mounted on a human head, for enlarging and projecting images of two display devices into the air through the respective optical systems so that the resultant image is observed as a virtual image by the viewer. According to this type of image display apparatus, it is possible to view a stereoscopic image, a wide-angle image, or a so-called panoramic image.

Figure 8:
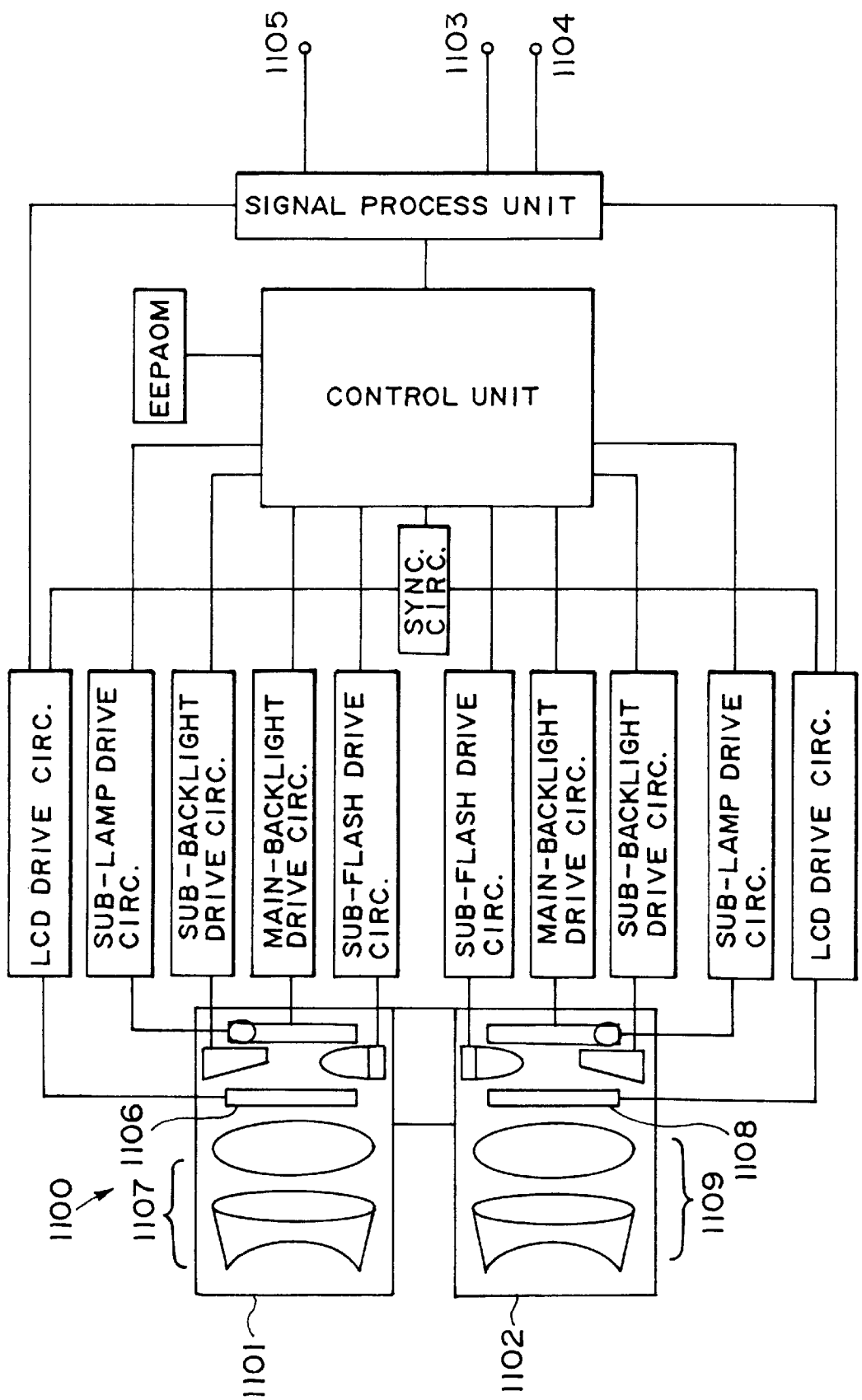
FIG. 8 is a block diagram showing a system of a display apparatus according to a second embodiment of the invention.

FIG. 8 is a block diagram of an example of such a HMD proposed by our research and development group. Referring to FIG. 8, the HMD apparatus 1100 includes a display unit 1101 for a right eye, a display unit 1102 for a left eye, and image signal input terminals 1103 and 1104 and a photometric data input terminal 1105 for receiving image data signals and photometric data signals from a compound eye camera (not shown). The right eye display unit 1101 includes a LCD 1106 for displaying images for a right eye and an optical system 1107 including lenses, etc., and the left eye display unit 1102 includes a LCD 1108 for displaying images for a left eye and an optical system 1109 including lenses, etc. In this way, images for right and left eyes are respectively displayed by using two LCDs.

FIGS. 9A–9C illustrate operations of such an image display apparatus for displaying a stereoscopic image, a wide-angle image or a panoramic image. For displaying a stereoscopic image, LCDs 1106' and 1108' (as display devices) and mirrors 1107' and 1109' (as optical systems) are disposed as shown in FIG. 9A so that two virtual display images for right and left eyes can be fused in the head of a viewer.

On the other hand, for displaying a panoramic image, the display devices and optical systems are disposed as shown in FIG. 9C so that two virtual images for the right and left eyes can be laterally joined in the head of a viewer.

Further, by disposing the display devices and optical systems at intermediate positions as shown in FIG. 9B which is intermediate between FIGS. 9A and 9C, a left-side portion of a virtual display image for a right eye and a right-side portion of a virtual image for a left eye overlap each other so that the viewer recognizes the overlapping portion as a stereoscopic image and the other portions as a panoramic image narrower than in the case of FIG. 9C.

Representative examples of dispositions of the display devices and optical systems for displaying a stereoscopic image, a wide-angle image and a panoramic image have been described with reference to FIGS. 9A–9C but their dispositions are not so determinative in a single way. More specifically, the display devices and optical systems can be arbitrarily moved in a lateral direction to arbitrarily set a stereoscopic or panoramic degree of image. The control can be performed manually by a viewer depending on the kind of display image or automatically by adding a discrimination signal to an image data signal for discriminating whether the image is a stereographic image or a panoramic image, etc.

In the image display apparatus according to the present invention constituted in the above-described manner, an initial position may be a stereographic image display position as shown in FIG. 9A wherein the left and light images are horizontally in alignment. This position is not necessarily limited for displaying a stereographic image but may also be adopted in the case of displaying an identical image on both left and right display apparatus. This state corresponds to a position as shown in FIG. 5A wherein the unit of the LCD 101 and the backlight 102 is moved to one side end of the LCD unit-moving frame 107. The unit position is detected by the position sensor 105 and, based on the detected position, the reflection frame 103 is set to be positioned at the other side end by the reflection frame support and control mechanism 104. Further, the backlight 102 is caused to approach the LCD 101 by the backlight-supporting member 108.

A panoramic-stereographic mixture image display position as shown in FIG. 9B where the left and right images partially overlap each other, corresponds to a position as shown in FIG. 5B. When the unit of the LCD 101 and the backlight 102 comes to a position as shown in FIG. 5B, based on the detected position, the backlight 102 is caused to retreat from the LCD 101. Then, the reflection frame 103 is inserted between the LCD 101 and the backlight 102 by the reflection frame support and control mechanism 104. The position of the reflection frame 103 is determined to correspond to the outer frames of the LCD 101 and the backlight 102, respectively. The position may be set to a position where the light quantity to the overlapping portion of the left and right images begins to fall, i.e., at a position close to the position represented by a second left vertical dash line in FIG. 1. When the unit arrives close to this position from the position shown in FIG. 5A, the position sensor 105 operates to initiate the above-mentioned operations.

From the position shown in FIG. 5B to the position shown in FIG. 5C, the reflection frame support and control mechanism 104 effects a control so as to retain the aligned positional relationship among the LCD 101, the backlight 102 and the reflection frame 103.

Figure 7:
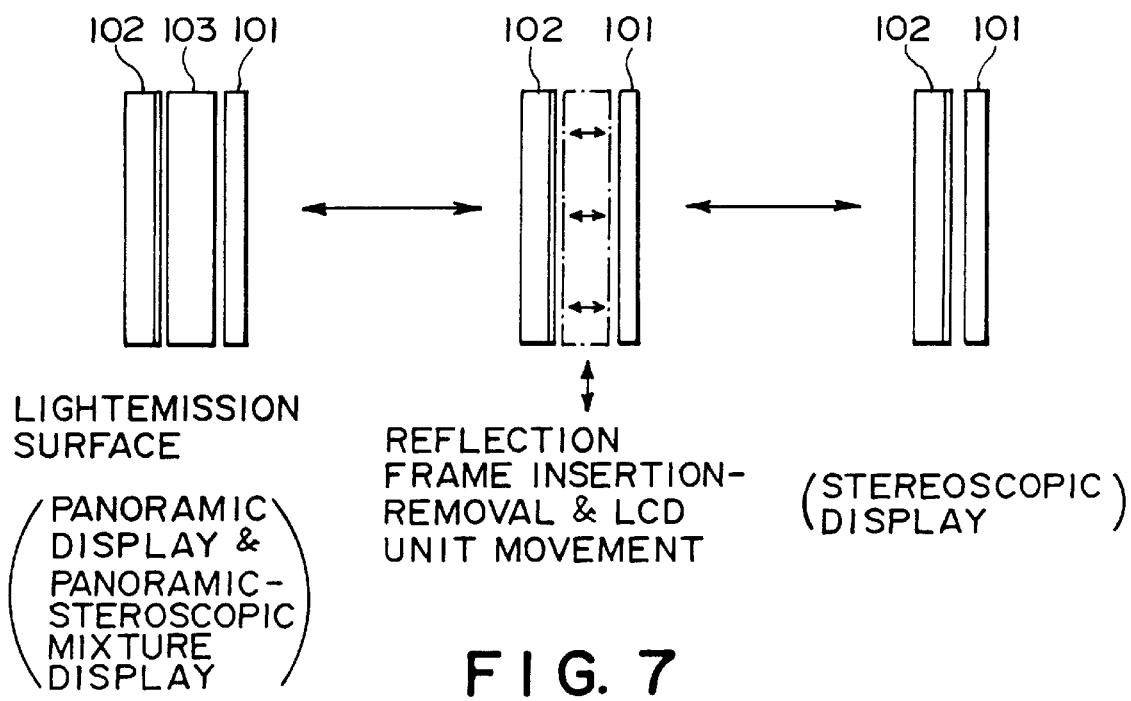
FIG. 7 includes schematic views for illustrating an operation of a display apparatus according to a first embodiment of the invention.

The positional relationships among the LCD 101, the backlight 102 and the reflection frame 103 are illustrate in summary by three figures in FIG. 7. FIG. 7 is drawn so that the device is seen from a rightward position. The backlight 102 is moved instead of the LCD 101 because the optical system is controlled to focus on the LCD 101 and the focusing state is retained by not moving the LCD 101.

Figure 10A:
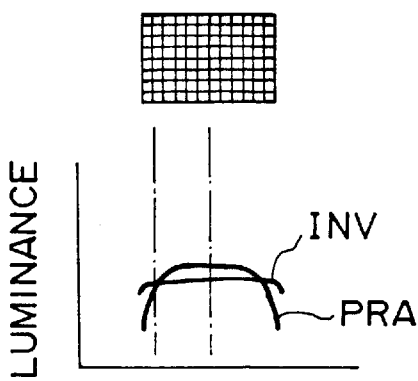
FIGS. 10A–10C are illustrations of light quantity distributions from backlights corresponding to positions in a horizontal direction of LCD in a binary image display apparatus.
Figure 10B:
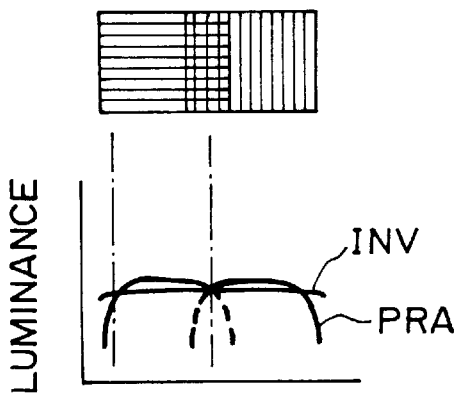
Figure 10C:
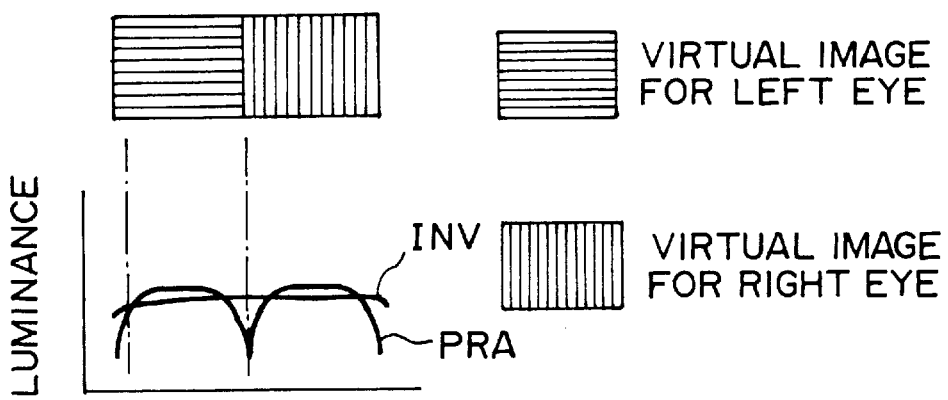

As is shown in FIG. 1, by the insertion of the reflection frame 103, the light quantity ratio between the periphery and the center increases from ca. 60% before the insertion to ca. 80–90% after the insertion, thus improving the light quantity irregularity. On the other hand, as the distance between the backlight 102 and the LCD 101 is increased by the insertion of the reflection frame 103, the entire luminance level can be somewhat lowered. Such a lowering in luminance is obviated at the time of stereoscopic image display as shown in FIG. 5A by causing the reflection frame 103 to retreat from the inserted position and causing the backlight 102 to approach the LCD 101. FIGS. 10A–10C show luminance distributions at the three positions shown in FIGS. 5A–5C, respectively. In FIGS. 10A–10C, the distributions denoted by PRA represent those obtained by a prior art apparatus and the distributions denoted by INV represent those obtained by this embodiment of the present invention.

In this embodiment, the reflection frame 103 has been inserted at all peripheral sides of the backlight 102. A particular problem to be concerned in this type of image display apparatus, however, is a light quantity decrease at the periphery on at least one side where the left and right images overlap each other, so that it is possible to dispose a reflection member (wall-like member) only along such one side. Incidentally, the above-mentioned unit of the LCD 101 and the backlight 102 can be moved manually or automatically by adding a discrimination signal to image signals and by recognizing such a discrimination signal.

In the above-described embodiment, a reflection frame 103 having an inside surface constituting an almost totally reflecting surface is inserted between a backlight 102 and a LCD 101 when the unit of the backlight 102 and the LCD 101 is at a horizontal position for a panoramic image display or a panoramic-stereoscopic mixture image display, thereby obviating a peripheral light quantity decrease of the backlight 102. As a result, it becomes possible to obviate an image quality degradation at the time of a panoramic image display or a panoramic-stereoscopic mixture image display due to a luminance distribution irregularity of the backlight 102 while obviating a remarkable luminance lowering at the center. Further, when the unit of the LCD 101 and the backlight 102 is at a horizontal position for a stereoscopic image display, the reflection frame 103 is removed, and the backlight 102 is caused to approach the LCD 101 to prevent the lowering in luminance at the center, thereby preventing an image quality degradation of a stereoscopic image.

As described above, according to this embodiment, a reflection frame having a reflecting surface is inserted between a LCD and a backlight to reduce a difference in light quantity between a periphery and the center of the backlight, thereby providing a good image free from luminance irregularity.

Further, by selecting an insertion position and a retreat position of the reflection frame, it is possible to realize two types of light quantity distribution of the backlight.

Further, by disposing a position sensor of the LCD and the backlight and controlling a reflection frame support and control mechanism based on the position detection result, it becomes easy to control the insertion-retreat control of the reflection frame, thereby ensuring a proper operation of the apparatus.

In a first state, the reflection frame may be inserted to reduce the light quantity difference between a periphery and the center of the backlight. In a second state, the reflection frame is caused to retreat and the backlight is brought in proximity to the LCD so as to reduce the light quantity decrease at the center. In this way, it is possible to provide an optimum backlight illumination condition as desired.

Further, by using at least two systems of display apparatus, it is possible to realize an image display apparatus, such as an HMD.

Further, by providing plural display apparatus each including a LCD and a backlight therefor and moving the plural display apparatus in association with each other so as to select a first position where all the display apparatus are placed in a first state or a second position where all the display apparatus are placed in a second state, it is possible to provide an optimum light quantity distribution of light source for a composite image display apparatus, such as an HMD.

(Third Embodiment)

A third embodiment of the present invention will now be described with reference to FIGS. 11 and 12.

Figure 11:
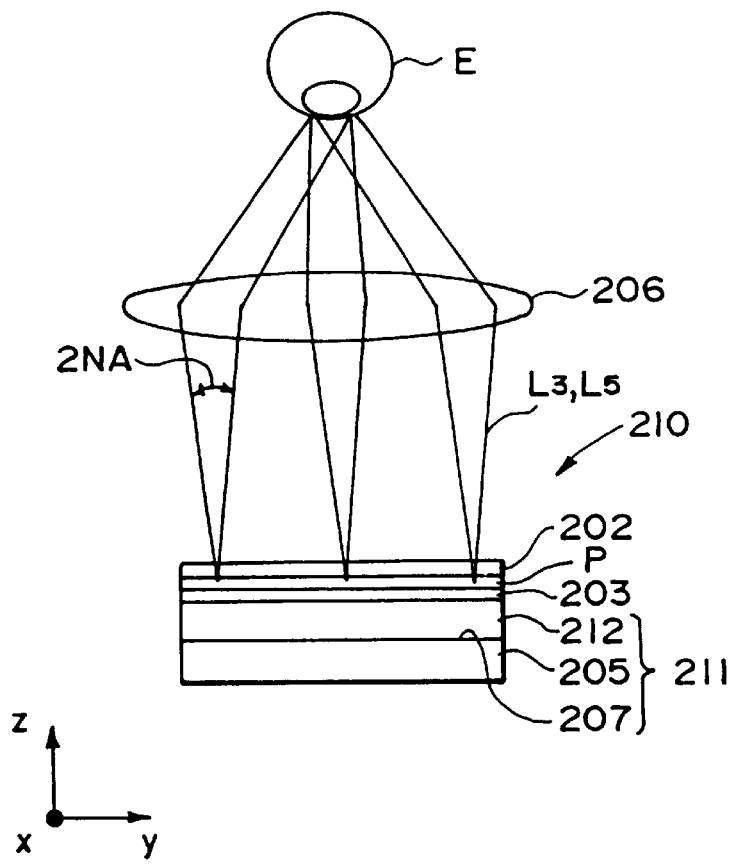
FIG. 11 is a schematic sectional illustration of an optical system including a display apparatus according to a third embodiment of the invention.
Figure 12:
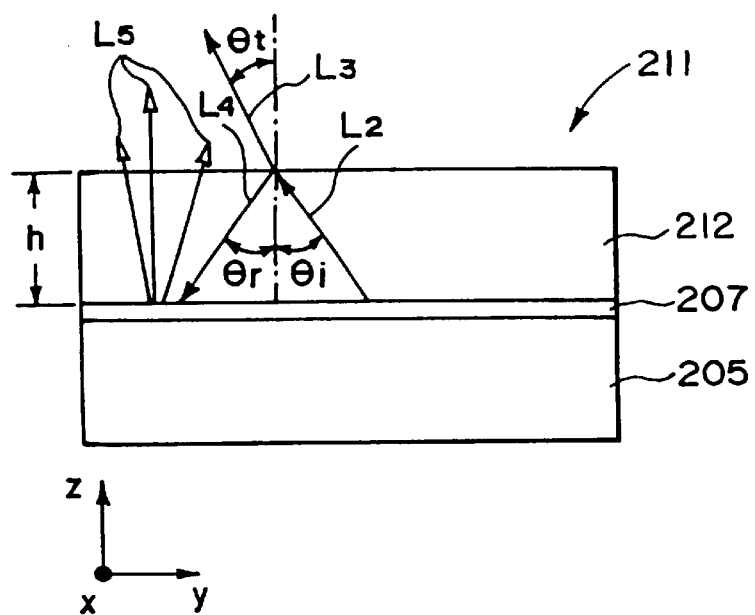
FIG. 12 is a schematic sectional view for illustrating a function of the third embodiment.

Referring to FIG. 11, a liquid crystal view finder (liquid crystal display apparatus) 210 includes a liquid crystal panel (liquid crystal display device) P. The liquid crystal panel P is of the transmission type and comprise two-dimensionally arranged pixels and electrodes so as to display various data. The panel P is sandwiched between a pair of polarizers 202 and 203 disposed in cross nicols.

The liquid crystal view finder 210 also includes an illumination device 211. The illumination device 211 comprises a thin cold-cathode lamp (light source) 205 provided with an upper scattering surface as a scattering member or means 207. Onto the scattering member 207, a transparent polycarbonate plate (sheet member) 212 is adhered, and the polycarbonate plate 212 is adhered to the lower surface of the polarizer 203. In this embodiment, the polycarbonate plate 212 is designed to have a refractive index n of 1.59, and the lower polarizer (a medium on a light-transmitted side of the sheet member) is designed to have a refractive index n' of 1.53. In this embodiment, a total reflection condition having a polarizing characteristic may be used as will be described hereinafter, so that a polycarbonate resin plate 212 having a good birefringence characteristic is used so as to provide an improved two-dimensional light quantity distribution.

A liquid crystal panel may provide an asymmetrical angle characteristic (viewing angle characteristic) in contrast distribution due to an asymmetrical characteristic of liquid crystal director orientations. For this reason, in this embodiment, a virtual image focusing optical system 206 is designed to constitute a telecentric system for guiding principal rays in a direction (Z-direction) normal to the liquid crystal panel P surface as shown in FIG. 11. In FIG. 11, a total aperture angle (=2 arcsin NA) is shown as 2NA. Depending on an illuminance at a retina of a human eye E, the pupil size of the eye E is changed to determine an effective light flux diameter entering the eye E and an effective NA for emission light from the liquid crystal panel P. As the brightness changes depending on the kind of image source and in order to facilitate the adjustment for alignment of the optical axis of the optical system and the optical axis of the eye E, a light reflux diameter of 6–8 mm may be required for a pupil of 1–2 mm. For this reason, the illumination device 211 may be evaluated with a light flux corresponding to NA of the optical system 206.

The function of this embodiment will be described with reference to FIG. 12.

Light emitted from the cold cathode lamp 205 is transmitted through the scattering member 207 and the acrylic plate 212 so that it is scattered at the scattering member 207 and transmitted through the polycarbonate plate 212 in various directions (only a light flux $L_2$ being shown). The light scattering state at this time is determined by the structure of the cold cathode lamp 205 and the scattering characteristic of the scattering member. The light flux $L_2$ transmitted through the polycarbonate plate 212 is at least partly reflected at the upper surface (boundary) of the polycarbonate plate 212 toward the scattering member 207 (a flux $L_4$) and at least a part thereof is reflected and scattered at the scattering member 207 (fluxes $L_5$). The reflectance at the upper surface of the polycarbonate plate 212 varies depending on the incidence angle $\theta_i$ of the flux $L_2$, which will be described hereinafter. Further, in case where the incidence angle $\theta_i$ is smaller than a critical angle $\theta c$, a portion ($L_3$) of the flux $L_2$ is emitted toward the liquid crystal panel without being reflected at the upper surface of the polycarbonate plate.

As a result, a portion of the reflected light and the light $L_5$ are transmitted through the upper surface of the polycarbonate plate 212 to be transmitted through the lower polarizer 203, where linearly polarized light is selectively allowed to be transmitted. The linearly polarized light transmitted through the lower polarizer 203 enters the liquid crystal panel P to be subjected to a birefringence effect at respective pixels depending on a two-dimensional image and converted into a two dimensional image while being transmitted through the upper polarizer 202. Of the thus-transmitted light, only a portion within 2NA of the optical system 206 is guided to the human eyes E to be recognized as data thereat.

In a conventional apparatus, the scattered light quantity is decreased at the four sides edge portions of the scattering member 207 by an angle component corresponding to either one NA of the 2NA, thus lowering the light quantity at peripheries.

On the other hand, this embodiment functions in the following manner. Of the forward scattered light $L_2$ from the scattering member 207, a portion having a large scattered angle and therefore a large incidence angle $\theta_i$ to the upper surface of the polycarbonate plate 212 shows a large reflectance at the upper surface of the polycarbonate plate 212, thereby providing a larger proportion component $L_4$ reincident to the reflecting member 207 at at a reflection angle $\theta_r$. Now, if the refractive index of the polycarbonate plate is denoted by n, the refractive index of a medium on a transmitted side of the polycarbonate plate is denoted by n' (refractive index of the polarizer 203 in this embodiment wherein the polarizer 203 is directly bonded to the polycarbonate plate 212; that of an adhesive in case where such an adhesive fills a gap between the polycarbonate plate 212 and the polarizer 203; or that of air in case where a spacing is provided between the polycarbonate plate 212 and the polarizer 203) and a refraction angle is denoted by $\theta_t$, the upper surface of the polycarbonate plate 212 may show amplitude reflectances $r_s$ and $r_p$ as follows for S polarized light and P polarized light, respectively:

$$r_s = -\sin(\theta_i - \theta_t)/\sin(\theta_i + \theta_t)$$

$$r_p = \tan(\theta_i - \theta_t)/\tan(\theta_i - \theta_t).$$

Based on the above and the following Snell's law:

$$n \cdot \sin \theta_i = n' \cdot \sin \theta_t,$$

a large incident angle $\theta_i$ to the polycarbonate plate 212 provides a larger intensity reflectance Rs ($=r_s^2$) of the S polarized light, the scattered light outside 2NA is preferentially reflected toward the scattering member 207. The intensity reflectance of the P polarized light decreases as the incidence angle $\theta_i$ increases up to the Brewster angle $\theta_0$ given by the following equation, and increases thereafter.

$$\tan \theta_0 = n'/n.$$

Further, in case of n>n', a total reflection condition is satisfied when the incidence angle reaches a critical angle $\theta c$ given by the following equation:

$$\sin \theta c = n'/n.$$

In the range of $\theta_0 < \theta_i < \theta_c$, a larger $\theta_i$ provides larger Rp and larger Rs. In the range of $\theta_i \geq \theta_c$, Rp=Rs=1, thus giving no transmitted light.

In the case of the above example wherein n=1.59 and n'=1.53, there result in $\theta_0$=43.9 deg. and $\theta_c$=74.2 deg., so that scattered light having an incidence angle of at least ca. 74 deg. is totally reflected.

This embodiment shows the following effects.

Figure 3:
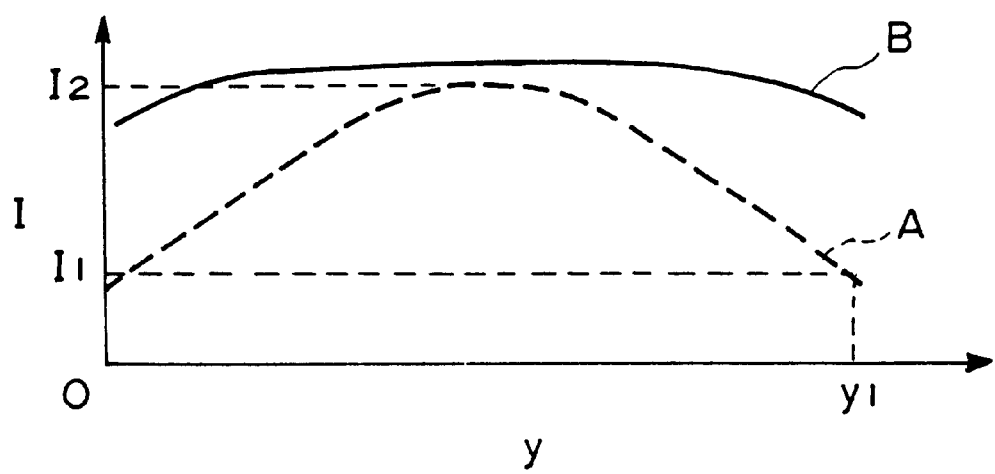
FIG. 3 is a graph showing light quantity distributions of illumination devices.

In a conventional case having no polycarbonate plate, a light flux as denoted by $L_2$ is not incident to a human eye E because of its emission direction. According to this embodiment wherein an polycarbonate plate 212 is inserted between the liquid crystal panel P and the scattering member or surface 207 of the cold cathode lamp 205, however, at least a portion ($L_4$) of the light flux $L_2$ is reflected at the upper surface of the polycarbonate plate 212 toward the scattering member 207. The resultant reflected light $L_4$ is scattered at a peripheral portion of the scattering member 207 and a portion ($L_5$) of the again scattered light is transmitted through the polycarbonate plate to be incident to a peripheral region of the liquid crystal panel P and guided within the 2NA of the optical system 206, thereby entering the human eye E. As a result, the light quantity entering the peripheral region of the liquid crystal panel P is increased compared with the conventional case, and the light quantity distribution is uniformized. A solid line in FIG. 3 represents a result of this embodiment based on data measured by us compared with a result in the conventional case represented by a dashed line in FIG. 3. As shown in FIG. 3, the light quantity entering the peripheral region of the liquid crystal panel P has been remarkably improved increased up to 70% of that at the center, thereby providing an improved light quantity distribution. Further, light from the peripheral region of the cold cathode lamp 205 also re-enters the central region of the scattering member 207 and is reflected thereat, so that the light quantity at the central region $I_2$ is also slightly increased.

Particularly, in this embodiment, the polycarbonate plate 212 is designed to have a refractive index n which is larger than the refractive index n' of the lower polarizer 203, total reflection can be utilized while it depends on the incidence angle $\theta_1$ of the transmitted light $L_2$, so that a further uniform light quantity distribution is realized.

By using such an illumination device 211 for illuminating a liquid crystal panel P, the image quality degradation of the liquid crystal panel can be prevented to provide good image qualities even in case of panoramic wide-angle images of wide objects such as sky or sea.

Further, the uniformization of light quantity distribution can be performed without locally decreasing the transmittance or lowering the illumination quantity.

The use of the polycarbonate plate 212 as a transparent sheet member in this embodiment allows an economical production of the illumination device 211.

(Fourth Embodiment)

Figure 13:
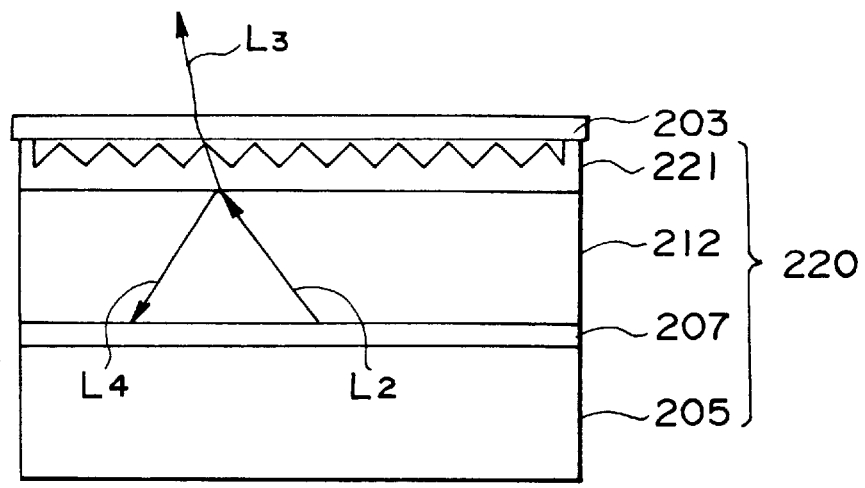
FIG. 13 is a schematic sectional view for illustrating a function of a display apparatus according to a fourth embodiment of the invention.

A fourth embodiment of the present invention will be described with reference to FIG. 13, wherein members identical to those in FIG. 11 are denoted by identical numerals, and description thereof will be omitted.

An illumination device 220 according to this embodiment includes a prism array (prism device) 221 bonded to a polycarbonate plate (transparent sheet member) 212. The prism array 221 is composed of a large number of micro-prisms. The prism array 221 (particularly the material thereof disposed on a light-transmitted side of the polycarbonate plate 212) is designed to have a refractive index n' which is lower than the refractive index n of the polycarbonate plate 212. The prism array 221 of the illumination device 220 is applied onto a lower surface of a lower polarizer 203, a liquid crystal panel P, etc. (not shown) is applied onto an upper side of the lower polarizer 203 similarly as in the third embodiment. The micro-prisms constituting the prism array 221 are designed to have a refractive index higher than that of air present between the prism array 221 and the polarizer 203.

The function of this embodiment will now be described.

Light emitted from a cold cathode lamp (light source) 205 is scattered at a scattering member 207 similarly as in the above embodiment. A portion ($L_4$) of light flux $L_2$ transmitted through the polycarbonate plate 212 is reflected at the upper surface of the polycarbonate plate, and another portion ($L_3$) is transmitted through the prism array 21. The transmitted light $L_3$ is provided with an improved directionality regarding its illumination direction by the prism array 221. Further, as the refractive index n' of the prism array is designed to be lower than the refractive index n of the polycarbonate plate 212, the light $L_2$ can cause total reflection depending on the incidence angle. Further, reflected light $L_4$ from the upper surface of the polycarbonate plate 212 is reflected and scattered at the scattering member 207 similarly as in the above embodiment.

This embodiment shows the following effects.

Transmitted light through the polycarbonate plate 212 is provided with an improved directionality by the prism array 221 to provide an increased light quantity incident to the human eye E.

Similar effects as in the third embodiment can be obtained. Thus, the light quantity distribution can be uniformized by the combination of the polycarbonate plate 212 and the scattering member 207, thereby preventing the image quality degradation of the liquid crystal panel P. Further, the uniformization of light quantity distribution can be performed without locally decreasing the transmittance or lowering the illumination quantity. The use of the polycarbonate plate 212 as a transparent sheet member in this embodiment allows an economical production of the illumination device 220.

(Fifth Embodiment)

Figure 14:
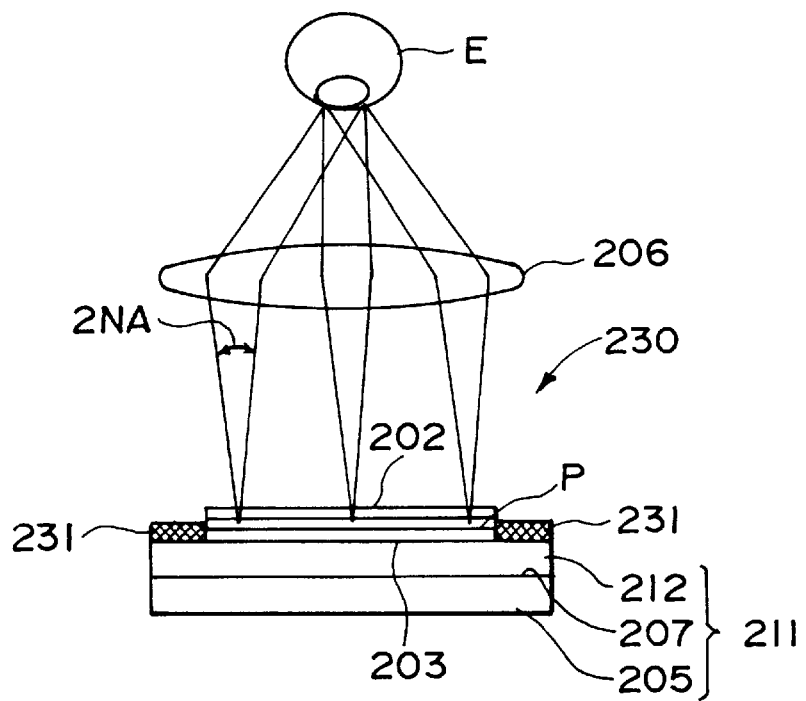
FIG. 14 is a schematic sectional view of an optical system including a display apparatus according to a fifth embodiment of the invention.

A fifth embodiment of the present invention will be described with reference to FIG. 14, wherein members identical to those in the fourth embodiment are denoted by identical numerals, and description thereof will be omitted.

A liquid crystal display apparatus 230 includes an illumination device 211 and a liquid crystal panel (liquid crystal display device) P, and the illumination device 211 is designed to have a larger areal size than that of the liquid crystal panel P (more specifically the area of the image display region thereof). A portion of the upper surface of the illumination device 211 outside a region thereof loaded with the liquid crystal panel P is covered with a frame-shaped light-shielding plate (light-shielding means) 231 bonded thereto, so as to obviate stray light by cutting off unnecessary illumination.

This embodiment shows the following effects.

Only a portion in the central area of light emitted from the illumination device 211 is utilized, so that the light quantity entering the peripheral region of the panel is increased compared with those in the former embodiments, so that the light quantity distribution is further uniformized, so that the image quality degradation of the liquid crystal panel P is prevented at a high level.

Similar effects as in the third embodiment can also be obtained. Thus, the light quantity distribution can be uniformized by the combination of the polycarbonate plate 212 and the scattering member 207, thereby preventing the image quality degradation of the liquid crystal panel P. Further, the uniformization of light quantity distribution can be performed without locally decreasing the transmittance or lowering the illumination quantity. The use of the polycarbonate plate 212 as a transparent sheet member in this embodiment allows an economical production of the illumination device 230.

Incidentally, in the above third embodiment, the refractive index n of the polycarbonate plate 212 is designed to be 1.59 and the refractive index n' of the lower polarizer 203 are designed to be 1.53. These values are not essential but can be appropriately determined depending on the scattering characteristic of the scattering member 207 and the structure of the cold cathode lamp 205. More specifically, in consideration of a light quantity distribution in the absence of the polycarbonate plate 212, in case where a larger difference is present between the central light quantity $I_2$ and the peripheral light quantity $I_1$ than the one represented by the dashed line A in FIG. 3, it is possible to increase the refractive index n and decrease the refractive index n' so as to lower the critical angle $\theta_c$, thereby further uniformizing the light quantity distribution. In this instance, it is further effective to increase the thickness h of the polycarbonate plate 212.

In the above embodiment, the refractive index n of the polycarbonate member 212 is set to be smaller than the refractive index n' of the material (the lower polarizer 203 or the prism array 221) disposed on the transmitted light side of the polycarbonate member 212. This is not however essential. Even in the case of n<n', it is also possible to utilize a reflected portion from the upper surface of the polycarbonate member even if it is decreased.

The polycarbonate plate 212 used in the above embodiments is not essential. Other plastic materials, such as polystyrene resin, can also be used to provide a light and economical illumination device similarly as in the above embodiments. It is also possible to use broad glass or abraded glass.

Particularly, in the case of adopting a structure wherein a spacing is provided between a sheet member 212 and a polarizer 203, the sheet member 212 may preferably comprise an acrylic (resin) plate. An acrylic plate may have a refractive index n of ca. 1.49 in contrast with the refractive index n' of ca. 1.00, thereby providing a critical angle $\theta_c$=42.2 deg., so that a very large proportion of light reflux can be totally reflected. Accordingly, the effect of this embodiment can be remarkably exhibited by this structure.

Moreover, an acrylic plate shows a smaller birefringence than a polycarbonate plate and can therefore provide the desired products more easily. Further, an acrylic plate is inexpensive.

The liquid crystal view finders disclosed in the above embodiments are designed to be not mounted on a human body but can be modified into a form adapted to be mounted on a human body, such as an HMD (head-mounted display) in the form of goggles or a helmet to be mounted on a face or a head. The HMD may be designed for a single eye or both eyes adapted for stereoscopic display. In the case of HMD for both eyes, it is possible to obtain a more natural image by providing an improved light quantity distribution allowing easier fusion of left and right images.

In the above-embodiments, a virtual image observation system including a virtual image focus optical system 206 has been described, but this is not essential. It is possible to apply the present invention to a direct see-type liquid crystal display apparatus not having such a virtual image focus system. The use of a liquid crystal panel P is not essential either, and the present invention can also be applied to a display apparatus not utilizing a liquid crystal. The bonding between the illumination device 211 and the lower polarizer 203 is not necessary either.

As described above, according to the above embodiments, a scattering member (or means) and a transparent sheet member are sequentially disposed contiguous to a light source, light emitted from the light source is better utilized by scattering and reflection at the scattering member, thereby providing a uniform light quantity distribution.

Further, in case where the sheet member is designed to have a refractive index n larger than a refractive index n' of a medium disposed on a transmitted light side of the sheet member, a portion of light transmitted through the sheet member at an angle lower than a certain critical angle causes total reflection at the boundary further between the medium and the sheet member, thereby further uniformizing the light quantity distribution.

Further, in the case of disposing a prism device on the light emission side of the sheet member, the light transmitted through (i.e., emitted from) the sheet member is provided with an improved directionality to increase the light quantity emitted from the illumination device and entering the human eyes.

When the above illumination device is applied to a liquid crystal display apparatus, it is possible to prevent the image quality degradation due to light quantity irregularity.

Further, the uniformization of the light quantity distribution can be accomplished without using a filter having a non-uniform transmittance distribution, so that it is possible to obviate the lowering in emitted light quantity per se from the illumination device, the image quality degradation due to dark illumination, and a lower power efficiency.

Further, in the case of using an illumination device having a larger area than a display device, it is possible to provide a further uniform light quantity distribution and a further improved image quality.

(Sixth Embodiment)

Figure 15:
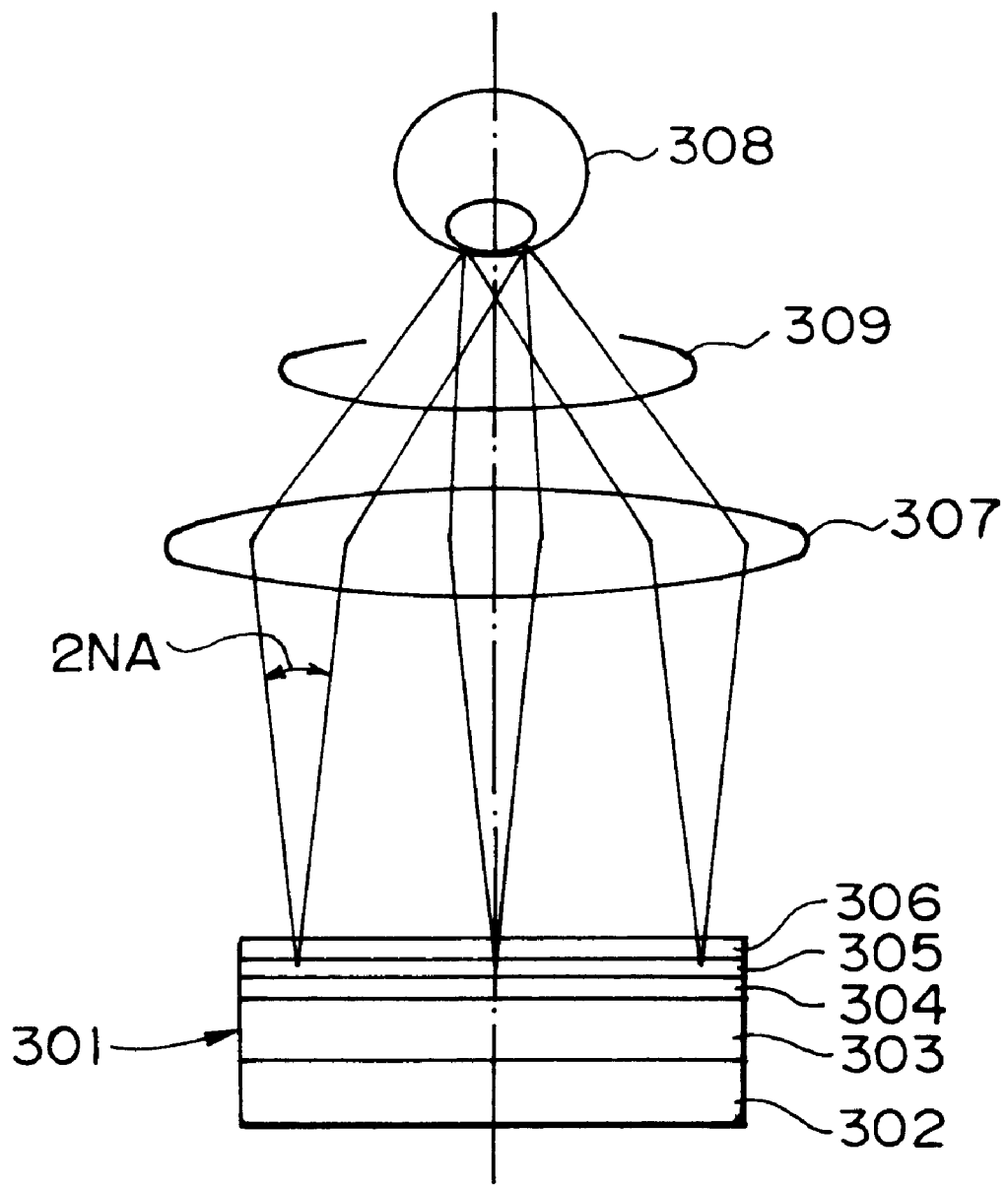
FIG. 15 is a schematic sectional view of an optical system including a display apparatus equipped with a surface illuminant device.

FIG. 15 is a schematic sectional view of an optical system including a display apparatus (a liquid crystal view finder) according to a sixth embodiment of the present invention.

Referring to FIG. 15 showing a section of a y-z plane, the liquid crystal display apparatus 301 includes a cold cathode lamp 302 as a light source, an inside reflection frame 303, polarizers 304 and 306 and a transmission-type liquid crystal panel 305. The optical system further includes a virtual image focusing system 306 for guiding light flux 308 from the liquid crystal display apparatus 301 to a human eye.

An illumination device (surface illuminant device) is constituted by the cold cathode lamp 302 and the inside reflection frame 303, and white diffused illumination light is emitted from the illumination device in the Z-direction and incident to a polarizer 304 as one of a pair of polarizers 304 and 306 arranged in cross nicols. By the polarizers, linearly polarized light is selectively formed and enters the liquid crystal panel 305 comprising pixels arranged two-dimensionally. When passing through the liquid crystal panel 305, the linearly polarized light is subjected to birefringence and then transmitted through the other polarizer 306 to be converted into a two-dimensional image having a light intensity distribution.

In the case of the color liquid crystal panel, the liquid crystal panel 305 is provided with a color filter (not shown) having color segments corresponding to the respective pixels. Of the light transmitted through the liquid crystal panel 305, only a portion within the aperture (shown as 2NA determined by an incident pupil and a focal length of the optical system 307) on the panel 105 side of the optical system 307 is guided to the eye 308.

In the case of a liquid crystal display panel, the transmitted light contrast distribution is provided with an asymmetrical angle characteristic (viewing angle characteristic) due to asymmetry of liquid crystal director orientations, so that the optical system 207 may preferably constitute a telecentric system for guiding principal rays in a direction (Z-direction) normal to the liquid crystal panel 305 surface as shown in FIG. 15.

In FIG. 15, the total aperture angle (=2 arcsin NA) is shown as 2NA. Depending on an illuminance at a retina of a human eye E, the pupil size of the eye E is changed to determine an effective light flux diameter entering the eye E and an effective NA for emission light from the liquid crystal panel P. As the brightness changes depending on the kind of image source and in order to facilitate the adjustment for alignment of the optical axis of the optical system and the optical axis of the eye E, a light flux diameter of 6–8 mm may be required for a pupil of 1–2 mm. For this reason, the illumination device 211 may be evaluated with a light flux corresponding to NA of the optical system 206.

Figure 16:
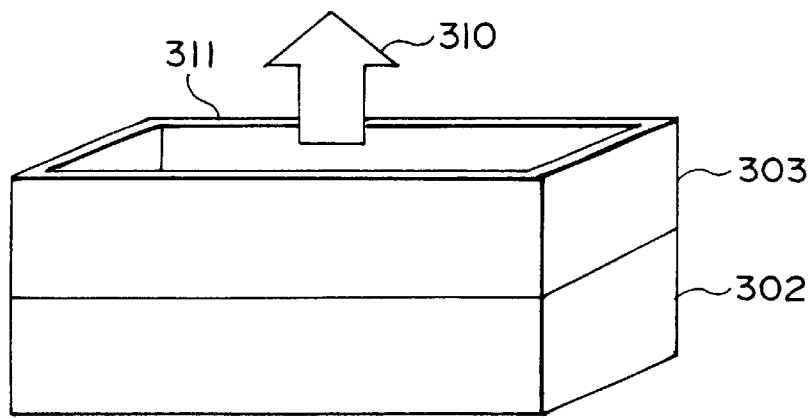
FIG. 16 is a schematic perspective view of a planar illuminant device according to the sixth embodiment of the invention.

FIG. 16 is a sectional view of a surface illuminant device (illumination device) according to this embodiment. Referring to FIG. 16, the inside reflection frame 303 disposed contiguous to the cold cathode lamp 302 has inside reflecting surfaces 311 provided with a reflection film for reflecting visible range light, so as to emit diffused illumination light 310 in the Z-direction.

More specifically, the inside reflection film 303 may be formed by injection molding of a plastic material, such as acrylic resin or polycarbonate resin, and inside surfaces thereof may be coated with a film of a metal, such as aluminum or chromium, or a dielectric laminate film, so as to provide a mirror surface. Such an inside reflection frame 303 may be adopted for mass production and produced stably and inexpensively.

The reflecting film can be further coated with a protective film of SiO or $SiO_2$, e.g., by vapor deposition, so as to increase the strength and durability. Further, the plastic substrate thereof can be formed integrally with a plastic member of the cold cathode lamp 302. This is advantageous in reduction of number of parts, increasing the reliability and reducing the production cost. It is also possible to form the inside reflection frame 303 by directly machining a metal having a good machinability, such as brass or bronze, to mirror-finish the inner surface as in production of a polygonal mirror used in a laser beam printer, while it may provide a somewhat increased weight. This is advantageous in providing increased durability against, e.g., heat, size accuracy and surface accuracy, and reduced change with time.

Further, it is also possible to form a mirror by bonding an aluminum foil onto a thin plastic substrate, and cut and form the mirror into an inside reflection frame also functioning as a barrel for the liquid crystal device. This may provide somewhat inferior surface accuracy and size accuracy but may be advantageous in production cost.

Figure 17:
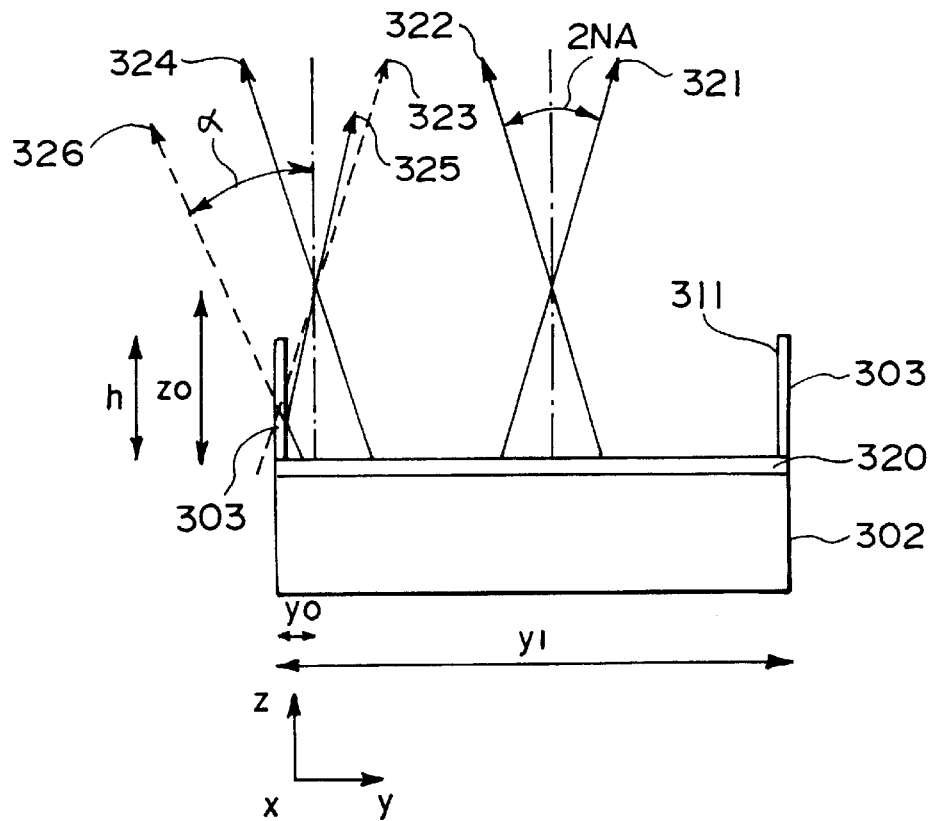
FIG. 17 is a view for illustrating an operation principle of the planar illuminant device according to the sixth embodiment of the invention.

FIG. 17 is a schematic sectional illustration (on a y-z plane in FIG. 16) for describing a principle for providing an improved light quantity distribution according to the illumination device of this embodiment.

Referring to FIG. 17, the upper surface of the cold cathode lamp 302 forms a diffusion or scattering surface 320 and emits diffusion light having a directional distribution determined by the structure of the cold cathode lamp 302 and the diffusion (or scattering) characteristic of the diffusion surface 320 in the Z-direction toward the liquid crystal panel (not shown).

Of the diffused light from the cold cathode lamp 302, only a portion within 2NA of the optical system 307 shown in FIG. 15 is guided to the eye 308. In the central region of the cold cathode lamp, light rays within an angle formed between light rays 321 and 322 are guided to the eye. Actually, the light rays are within a three dimensional cone but are explained to be within a two-dimensional angle.

On the other hand, in a peripheral region, light rays between a light ray 324 and hypothetical light ray 323 can be guided to the eye 308, but a part of the cold cathode lamp emitting the hypothetical light ray 323 is out of the end of the cold cathode lamp and is actually not present. Accordingly, the light quantity in such a peripheral region is caused to remarkably decrease in the case of a conventional illumination device not having the inside reflection frame 303.

In this embodiment of the illumination device (surface illuminant device) having the inside reflection frame 303, a light ray 326 going outside 2NA in a conventional device is reflected by the inside reflection frame 303 to form a reflected light ray 325 within 2NA to alleviate the light quantity decrease in the peripheral region.

Now, it is assumed that the inside reflection frame 303 has an inside reflection surface having a height h, the liquid crystal panel is disposed at a distance $z_0$ from the diffusion surface 320, and the diffusion surface 320 has a size $y_1$. Further, a certain flux of light rays including a central ray normal to the diffusion surface are considered so that the central ray is disposed at a distance $y_0$ from a periphery, each ray has an angle $\alpha$ from the normal, and $\theta$=arcsin NA. In the case where the inside reflection frame 303 is absent, a light flux entering in NA of the optical system 307 within the light flux at a peripheral position $y_0$ entering the liquid crystal panel is determined by angles $\alpha$ with respect to left periphery: $0 \leq y_0 \leq z_0 \cdot \tan \theta$ right periphery: $y_1 - z_0 \cdot \tan \theta \leq y_0 \leq y_1$ as follows (when the angle a is taken positive in a clockwise rotation direction about a normal to the liquid crystal panel):

left periphery: $-\theta \leq \alpha$ arctan $(y_0/z_0)$ right periphery: $-\arctan((y_1-y_0)/z_0) \leq \alpha \leq \theta$, thus showing that the light quantity is reduced as the position approaches the periphery.

On the other hand, in the case where the inside reflection frame 303 is present according to this embodiment, the light rays having an angle determined as follows are guided within NA:

left periphery: $-\theta \leq \alpha \leq \arctan(y_0/(z_0-h))$ or $\theta$ right periphery: $-\theta$ or $-\arctan((y_1-y_0)/(z_0-h)) \leq \alpha \leq \theta$.

Thus, it is shown that the decrease in light quantity at the peripheral region is alleviated. It is also shown by the above formulae that a higher degree of improvement can be attained as the reflection frame height is set to be closer to the liquid crystal panel position $z_0$ according to the NA of the optical system 307.

FIG. 18 schematically illustrates the effect of light quantity distribution uniformization according to this embodiment. The abscissa y represents a lateral position on the illumination device having a lateral size $y_1$, and the ordinate I represents a light quantity guided within NA (three dimensional) of the optical system 307. A dashed line 331 represents a light quantity distribution in a conventional case where the inside reflection frame 303 is absent, showing the light quantity at the periphery decreases down to 30% of that at the central region. A solid line 330 represents an improved light quantity distribution according to this embodiment, showing that the light quantity at the periphery is recovered to 70% of that at the central region.

An identical effect is accomplished in the x-z plane so that the light quantity distribution improvement according to this embodiment is accomplished two-dimensionally, i.e., both in the x-axis and y-axis directions.

(Seventh Embodiment)

This embodiment is directed to a surface illuminant device (illumination device) provided with an improved uniformity due to an improvement in directionality by adding a directionality controlling means.

FIG. 19 shows such an improved illumination device, wherein identical or like parts are denoted by identical numerals. Referring to FIG. 19, a prism array 340 is disposed contiguous onto the diffusion surface 320, thereby improving the directional characteristic of the diffused light in the y-axis direction in addition to the above-mentioned light quantity uniformization effect according to the inside reflection frame 303.

(Eighth Embodiment)

Figure 20:
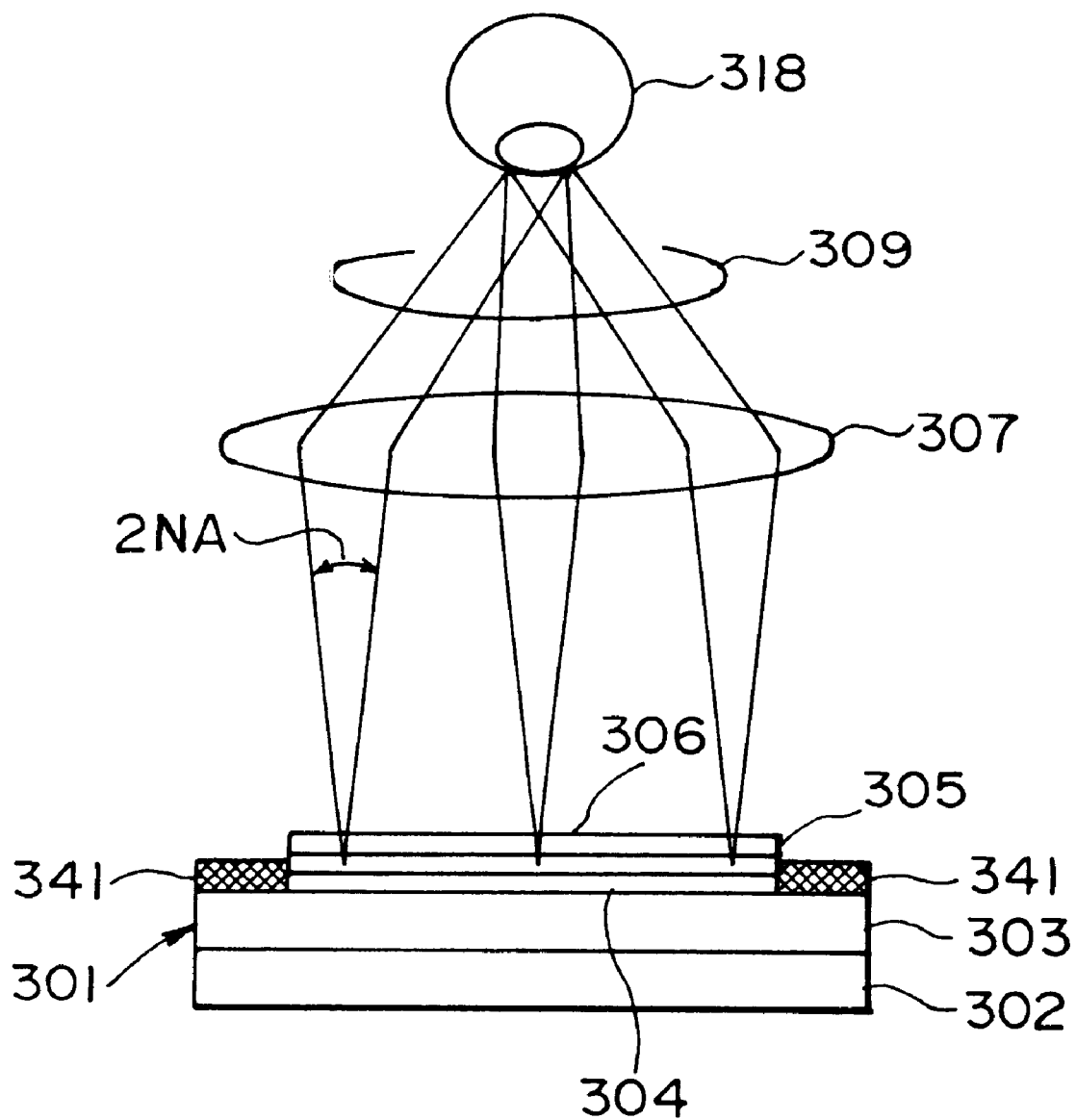
FIG. 20 is a schematic sectional view of an optical system including a display apparatus according to an eighth embodiment of the invention.

An eighth embodiment of the display apparatus according to the present invention is illustrated in FIG. 20 wherein identical or like parts are denoted by identical numerals as in FIG. 15.

Referring to FIG. 20, the display apparatus 301 includes a liquid crystal panel 307 and an illumination device (including the lamp 302 and the reflection frame 303) designed to have a larger area than the image display region size of the liquid crystal panel 307, so as to utilize only a high light quantity uniformity region of light from the illumination device as illumination light. This results in a wasteful illumination device portion, a lower power efficiency and an increase in size and weight of the apparatus, but provides an ideal level of image quality. Incidentally, a light shielding frame 341 is disposed so as to obviate stray light by cutting off unnecessary illumination. As a result, it becomes possible to selectively utilize a region of the highest uniformity of light quantity distribution through a light shielding frame as illumination light, thereby providing extremely good image quality.

As the essential effect of the present invention is to obviate a decrease in light quantity at the edge or peripheral region of an illumination device. Accordingly, the use of a reflection frame having four reflection surfaces is not necessary. For example, the case of one reflection surface is also effective in alleviating the light quantity decrease at the corresponding edge or peripheral region to provide a better light quantity distribution.

As described with reference to FIG. 17 and mathematical formulae, it is possible to modify the height h or the position in x-axis and y-axis directions of the reflection frame or surface 303, so as to effect an optimization corresponding to the display apparatus used. Regarding an arrangement in z-axis direction, the reflection frame 303 need not be in contact with the diffusion surface 302 but can be spaced from the diffusion surface 302, thereby to still exhibit some effect.

In the above embodiments, the reflection frame has been explained to have a reflection surface almost perpendicular to the diffusion surface 302, but it is possible to incline the reflection surface(s) with respect to the diffusion surface so as to control the light dispensing characteristic and guide the illumination light in a desired direction depending on the required light dispersing characteristic and NA, thus effecting a uniformization of light quantity distribution in a broader sense. For example, it is possible to set different inclination angles for four reflection surface, e.g., so that the opposite inner surfaces are parallel, or inwardly inclined or outwardly inclined in the light emission direction, so as to be suitable for providing a desired light quantity distribution.

As described above, according to the present invention, it is possible to provide an illumination device (surface illuminant device) having an improved two-dimensional light quantity distribution and a high uniformity of light quantity distribution.

Further, according to the present invention, it is also possible to provide an illumination device with an improved light quantity distribution, particularly in one of two-dimensional directions, i.e., with a one-dimensionally high uniformity of light quantity distribution.

Further, according to the present invention, it is also possible to use a light-shielding frame, so as to select a particularly high uniformity region of light quantity distribution thereby providing a better uniformity of illumination light quantity distribution.

The illumination device according to the present invention may suitably be combined with a display device having a light-shielding film comprising a dark-colored organic resin (i.e., so called black matrix (BM)) between color filter segments, because the reflected light from the light-shielding film (BM) portion than in a display device using an inorganic black matrix of, e.g., chromium. As a result, it becomes possible to provide an improved contrast in the peripheral region on the display surface.

What is claimed is:

1. A display apparatus, including:
   an illumination device comprising a planar light source showing a luminance distribution falling toward its peripheries, a scattering means disposed contiguous to the light source for scattering emitted light from the light source when the emitted light passes the scattering means, and a transparent sheet member disposed contiguous to the scattering means and having a flat major surface on a transmitted light side thereof;
   a polarizer sheet having a refractive index n' disposed contiguous to the flat major surface of the transparent sheet member; and
   a display panel disposed opposite to the illumination device with respect to the polarizer sheet and illuminated by the illumination device via the polarizer sheet,
   wherein the transparent sheet member has a refractive index n so as to satisfy n>n' for effectively directing reflected light from the major surface thereof toward the scattering means.

2. A display apparatus according to claim 1, wherein the illumination device has a larger area than the display panel including a marginal surface area outside the display panel, said marginal surface area is covered with a light-shielding means so as to avoid unnecessary illumination light.

3. A display apparatus, including:

an illumination device comprising a light source, a scattering means disposed contiguous to the light source for scattering emitted light from the light source, and a transparent sheet member disposed contiguous to the scattering means and having a flat major surface on a transmitted light side thereof;

a polarizer sheet having a refractive index n' disposed contiguous to the flat major surface of the transparent sheet member; and a display panel disposed opposite to the illumination device with respect to the polarizer sheet and illuminated by the illumination device via the polarizer sheet, wherein the transparent sheet member has a refractive index n so as to satisfy $n > n'$ for effectively directing reflected light from the major surface thereof toward the scattering means.

4. A display apparatus according to claim 3, wherein the illumination device has a larger area than the display panel including a marginal surface area outside the display panel, said marginal surface area is covered with a light-shielding means so as to avoid unnecessary illumination light.

* * * * *